(12) United States Patent
Fujita et al.

(10) Patent No.: US 7,753,531 B2
(45) Date of Patent: Jul. 13, 2010

(54) IMAGE DISPLAY APPARATUS AND PROJECTION OPTICAL SYSTEM

(75) Inventors: Kazuhiro Fujita, Machida (JP); Takanobu Osaka, Yokohama (JP); Kazuya Miyagaki, Yokohama (JP); Atsushi Takaura, Machida (JP); Masanori Kobayashi, Yokohama (JP); Hiroyuki Sugimoto, Kawasaki (JP); Kenji Namie, Yokohama (JP); Yumi Matsuki, Kawasaki (JP); Toshiaki Tokita, Yamato (JP)

(73) Assignee: Ricoh Company, Ltd., Tokyo (JP)

( * ) Notice: Subject to any disclaimer, the term of this patent is extended or adjusted under 35 U.S.C. 154(b) by 852 days.

(21) Appl. No.: 11/579,327

(22) PCT Filed: May 11, 2005

(86) PCT No.: PCT/JP2005/009009

§ 371 (c)(1),
(2), (4) Date: Nov. 1, 2006

(87) PCT Pub. No.: WO2005/111714

PCT Pub. Date: Nov. 24, 2005

(65) Prior Publication Data

US 2007/0268541 A1 Nov. 22, 2007

(30) Foreign Application Priority Data

May 13, 2004 (JP) .............................. 2004-143834
Feb. 9, 2005 (JP) .............................. 2005-033403

(51) Int. Cl.
*G03B 21/28* (2006.01)

(52) U.S. Cl. .............................. 353/50; 353/20; 353/30; 353/31; 353/38; 353/46; 353/48; 353/51; 353/121; 353/122; 345/55; 345/204; 359/196.1; 359/197.1

(58) Field of Classification Search .................. 353/50, 353/38, 20, 30, 31, 102, 46, 48, 51, 121, 353/122; 345/55, 204; 349/196.1, 197.1
See application file for complete search history.

(56) References Cited

U.S. PATENT DOCUMENTS 5,042,929 A * 8/1991 Tanaka et al. ............... 359/708

(Continued)

FOREIGN PATENT DOCUMENTS

JP 2 64690 3/1990

(Continued)

*Primary Examiner*—Georgia Y Epps
*Assistant Examiner*—Sultan Chowdhury
(74) *Attorney, Agent, or Firm*—Oblon, Spivak, McClelland, Maier & Neustadt, L.L.P.

(57) ABSTRACT

An image display apparatus acquires a high-quality image by suppressing positional fluctuation of projected dots due to a positional offset of an optical path deflecting element. A spatial light modulation element (1) displays an image by projecting a light from an illumination light source. A projection optical system (3) enlarges and projects the image formed on the spatial light modulation element (1). An optical path deflecting element (2) is provided between the spatial light modulation element (1) and the image formed on a screen (4) so as to deflect an optical path in accordance with a screen frame period. The optical path deflecting element (2) shifts the optical path for the image projected on the screen (4) at a high rate so as to apparently increase a number of picture elements. The optical path deflecting element (2) is located within the projection optical system.

16 Claims, 11 Drawing Sheets

U.S. PATENT DOCUMENTS

| | | | |
|---|---|---|---|
| 5,743,612 A * | 4/1998 | Matsuda et al. | 353/97 |
| 6,497,488 B1 | 12/2002 | Yamauchi et al. | |
| 6,866,404 B2 | 3/2005 | Yamauchi et al. | |
| 7,128,420 B2 * | 10/2006 | Kapellner et al. | 353/38 |
| 7,182,463 B2 | 2/2007 | Conner et al. | |
| 2005/0231651 A1 * | 10/2005 | Myers et al. | 348/744 |

FOREIGN PATENT DOCUMENTS

| | | |
|---|---|---|
| JP | 4 113308 | 4/1992 |
| JP | 6 197297 | 7/1994 |
| JP | 7 36054 | 2/1995 |
| JP | 10 78623 | 3/1998 |
| JP | 2000 314920 | 11/2000 |
| JP | 2001 51231 | 2/2001 |
| JP | 2002 139792 | 5/2002 |
| WO | WO 2005/045506 A1 | 5/2005 |

* cited by examiner

IMAGE DISPLAY APPARATUS AND PROJECTION OPTICAL SYSTEM

TECHNICAL FIELD

The present invention relates to image forming apparatuses and, more particularly, to an image forming apparatus for observing an image by enlarging by a lens, the image being formed on a small image display element having a plurality of image elements which can control light in accordance with image information, the image forming apparatus being applicable to an electronic display apparatus such as a projection display.

BACKGROUND ART

An image display apparatus, which displays an image that is produced by enlarging by a projection lens an image formed by an image displayed on an image display element having a plurality of picture elements that can control light in accordance with image information, is widely used by being referred to as a front projector or a rear projector. As an image display element of such a kind, a CRT, a liquid crystal panel, DMD (digital micron mirror device (Registered Trade Mark): manufactured by Texas Instruments Incorporated) have been developed and used. Additionally, an inorganic EL, an inorganic LED, an organic LED, etc. are studied.

Moreover, as an image display apparatus, which does not display an enlarged image but display an image with an original scale, there have been developed and used a plasma display and a fluorescent display tube in addition to the above-mentioned CRT, liquid crystal panel, inorganic EL, inorganic LED, organic LED. Additionally, a field emission display (FED), a plasma addressing display (PALC), etc., are studied. Although they are generally classified into two types, a self-emission type and a spatial light modulator type, each has a plurality of picture elements that can control light.

A demand common to the above-mentioned image forming apparatuses is to achieve a high resolution, that is, to increase a number of picture elements. A display apparatus for HDTV having about one thousand scanning lines for broadcast use has already been on a market. Additionally, a development of a display apparatus having about two thousand scanning lines has been announce for the purpose of use as a work station computer with an increased resolution by using a liquid panel technique. However, increasing the number of picture elements may deteriorates a yield rate of a liquid crystal panel and may decrease an open area ratio. Thereby, there are problems that a cost is increased, brightness and contrast are decreased, and a power consumption is increased.

In order to solve the above-mentioned problems, Japanese Patent No. 2939826 and Japanese Laid-Open Patent Application No. 6-197297 disclose image display apparatuses that perform an interlace display having twice number of picture elements using a single image display element. Japanese Laid-Open Patent Application No. 7-36504 discloses a display apparatus having more than four times a number of picture elements using a single image display element. These display apparatuses are of a so-called picture element shift type, which is a method to increase an apparent number of picture elements by deflecting an optical path of a light projected from an image display element at a high speed with time division. Japanese Laid-Open Patent Application discloses a technique to increase a resolution by increasing an entire image by an optical path deflecting means.

Specifically, the projection display apparatus disclosed in Japanese Patent No. 2939826 comprises at least one optical element capable of rotating a deflection direction of a transmitting light and at least one transparent element having a birefringent effect in the middle of an optical path from a display element to a screen, wherein means for shifting an image formed by a display element within a projection optical path. Additionally, the projection display apparatus further comprises means for discretely projecting projection areas of picture elements of a display element by effectively reducing an open area ratio of the display element so as to make an attempt to improve contrast.

The liquid crystal projector disclosed in Japanese Laid-Open Patent Application No. 6-197297 is configured and arranged to change an inclination of a glass plate of a variable prism by a control of a control circuit, wherein when the glass plate inclines upward, an optical axis is refracted downward by a predetermined angle by being passed through the variable prism and when the glass plate inclines downward, the optical axis is refracted upward by a predetermined angle by being passed through the variable prism. That is, by changing the wedge shape configuration of the prism, an incident angle to the projection optical system is deflected by a minute angle so as to achieve image shifting.

By performing a control of a control circuit repeatedly in synchronization with a vertical synchronization signal or the like, a resolution of an image projected onto a screen is improved. In the image display apparatus disclosed in Japanese Laid-Open Patent Application No. 2002-139792, an amount of shift of an intersection between a screen and an optical axis before and after deflection by a light deflecting means is set to be equal to a width of an image piece that is a projected image on a line passing each intersection so as to display a plurality of image pieces by deflecting lights by the light deflecting means at a predetermined time interval. That is, a number of picture elements of an image formed by an optical modulation element is increased by the light deflecting means.

FIG. 1 shows a basic structure of a projection optical system of a conventional image display apparatus that shifts picture elements at a high speed by using an optical path deflecting element so as to apparently increasing a number of picture elements. FIG. 2 shows a positional relationship between a light valve and a projection lens.

In FIG. 1, an optical path deflecting element 2 is located between a light valve 1 and a projection optical system having projection lenses 5 and 6. A light passed through the optical path deflecting element is projected onto a screen 4. The optical path deflecting element 2 has a function to deflect the optical path by an angle corresponding to a half pitch of a displayed picture element pitch. In this case, BF is a back focus of the projection lenses of the projection optical system 3, D is an interval between the liquid crystal panel (light valve 1) and the optical path deflecting element 2 (D<BF), and P is an image picture pitch of the light valve 1.

Since the optical path deflecting angle is very small as compared to the interval D, if the deflecting angle is required to be $\Delta\theta$ for the optical path deflecting element 2, the following relationship is established.

$$\tan \Delta\theta \approx \sin \Delta\theta \approx P/2D$$

For example, if P=14 μm and D=30 mm, $\Delta\theta$=48.1 seconds, i.e., $\Delta\theta$=0.01336 degrees. Contrary, if $\Delta\theta$ is determined, an amount of shift $\Delta S$ is calculated by $P/2 = D \cdot \sin \Delta\theta$.

It is appreciated that a value of P/2 is in proportion to a value of D. That is, it is appreciated that a positional relationship between the light valve 1 and the optical path deflecting element 2 gives influence to the amount of shift ΔS.

On the other hand, it is possible to maintain a performance by eliminating an adjusting process by making parts tolerances and assembly tolerances severe when assembling light valves, various prisms and projection lenses to a housing of the projection apparatus in an assemble process of the conventional image forming apparatus. However, distributing the tolerances to achieve a performance by merely gathering parts may increase a part cost and an assemble cost, which is not practical.

Actually, a performance for projecting an image onto a screen is maintained by a so-called focus adjustment in which accuracy of various kinds of parts and accuracy of positioning have certain tolerances and the light valve, which finally corresponds to an object face, is minutely moved in an optical axis direction. In such a present condition, a consideration was given to a case where the optical path deflecting element 2 is located between the projection lens 5 and the light valve 1.

For example, when a deflecting element having D=30 mm, P=14 μm and Δθ=48.1 seconds is set, al focus adjustment range of is given to a panel so that a position setting error of the deflecting element is about ±0.5 mm. ±0.5 mm corresponds to a value of 3.4% of 30 mm.

Therefore, if a position adjustment of the panel in an optical axis direction is performed in a state where the deflecting element is fixed, an error of 3.2% of a shift error of 7 μm, that is, an error of 0.22 μm is generated. Although this value is very small, there may be a problem when lines are displayed with subtly different widths as to whether odd dots are ON or even dots are ON in a line and space display.

In FIG. 2, in order to explain the above-mentioned problem, the amount of shift is enhanced for the sake of easy recognition. The picture element at a position of "O" on the light valve 1 travels with a light flux indicated by solid lines toward the optical path deflecting element 2, and is switched toward two directions indicated by solid lines and dashed lines at a high speed, and as if an image of a picture element at a position "O'" is projected by the object lens onto the screen. An amount of shift is equal to a distance A shown in FIG. 2.

However, if the light valve 1 is adjusted to a position indicated by dashed lines by focal position registration of the light valve 1, an amount of shift of a picture element on the light valve 1 observed from the object lens 5 is A+Δ, and it can be appreciated that the amount of shift of the picture element is fluctuated. Moreover, since a time period of shifting the picture element depends on a drive period of the optical path deflecting element 2, there always is a display leak within the time period, and the leaking light gives an influence to degrade resolution. Although the light is cut in the conventional apparatus so as to prevent such a degradation in resolution, a further improvement is required in the viewpoint of effective use of light, and there is a room for improvement.

It should be noted that FIG. 3 is an illustration showing a conventional structure in which an optical path deflecting element is located between a projection optical system and an spatial light modulation element.

DISCLOSURE OF THE INVENTION

It is a general object of the present invention to provided an improved and useful image display apparatus in which the above-mentioned problems are eliminated.

A more specific object of the present invention is to provide an image display apparatus and a projection optical system that can acquire a high-quality image by suppressing positional fluctuation of projected dots due to a positional offset of an optical path deflecting element.

In order to achieve the above-mentioned objects, there is provided according to one aspect of the present invention an image display apparatus, comprising: an illumination light source; a spatial light modulation element that displays an image; a projection optical system that enlarges and projects the image formed on the spatial light modulation element; an optical path deflecting element provided between the spatial light modulation element and the image formed on a screen by the projection optical system so as to deflect an optical path for the image projected on the screen in accordance with a screen frame period, the optical path deflecting element shifting the optical path for the image projected on the screen at a high rate so as to apparently increase a number of picture elements, wherein the optical path deflecting element is located within the projection optical system.

According to the above-mentioned invention, focusing in the optical axis direction can be performed while maintaining the relationship between the spatial light modulation element and the optical path deflecting element. Thus, a fluctuation in the amount of shift of the picture elements on the screen can be eliminated, which achieves finer image display.

In the image display apparatus according to the present invention, the optical path deflecting element may be s located at or in the vicinity of an aperture position of the projection optical system. Accordingly, in-plane variation of the deflecting angle due to in-plane variation of the optical path deflecting element. Additionally, the optical path deflecting element may be a reflection type optical path deflecting element. Alternatively, the optical path deflecting element may be a galvanometer mirror. Alternatively, the optical path deflecting element may be a mirror array having mechanically movable mirrors arranged two-dimensionally.

In the image display apparatus according to the present invention, a multiple screen display may be performed by increasing an amount of a shift of picture elements acquired by the optical path deflecting element to be larger than a width of an arrangement of the picture elements in a direction of the shift of the picture elements.

In image display apparatus according to the present invention, the optical path deflecting element may include at least two sets of elements each of which shifts the picture elements in one direction so that the picture elements are shifted at a high rate in directions perpendicular to each other.

In the image display apparatus according to the present invention, the optical path deflecting element may include first and second optical path deflecting elements, the first optical path deflecting element deflecting the picture elements by an amount of shift smaller than a pitch of the picture elements, the second optical path deflecting element deflecting the picture elements by an amount of shift corresponding to an effective picture element area, so as to increase an apparent number of picture elements displayed and increase a display area.

There is provided according to another aspect of the present invention an image display apparatus, comprising: an illumination light source; a spatial light modulation element that displays an image; a projection optical system that enlarges and projects the image formed on the spatial light modulation element; an optical path deflecting element that is provided between the spatial light modulation element and the image formed on a screen by the projection optical system, and deflects an optical path for the image projected on the screen in accordance with a screen frame period, the optical path deflecting element shifting the optical path for the image projected on the screen at a high rate so as to apparently increase a number of picture elements, wherein an aspect ratio of the screen is changed by setting an amount of shift acquired by the optical path deflecting element to a value equal to or greater than an amount corresponding to a number of picture elements in one of a vertical direction and a horizontal direction and smaller than an amount corresponding to a number of picture elements in the other of the vertical direction and the horizontal direction. According to the above-mentioned invention, the effective picture element display area of the spatial light modulation element is increased so as to form a high-quality image.

In the image display apparatus according to the above-mentioned invention, in a center portion of the screen where images are apparently overlapped with each other, an amount of shift of the picture elements may be increased by an amount equal to or smaller than a pitch of the picture elements so as to apparently increase a picture element density in the center portion.

Additionally, in the image display apparatus according to the above-mentioned invention, a multiple screen display may be performed by increasing an amount of a shift of picture elements acquired by the optical path deflecting element to be larger than a width of an arrangement of the picture elements in a direction of the shift of the picture elements.

In the image display apparatus according to the above-mentioned invention, the optical path deflecting element may include at least two sets of elements each of which shifts the picture elements in one direction so that the picture elements are shifted at a high rate in directions perpendicular to each other.

In the image display apparatus according to the above-mentioned invention, the optical path deflecting element may include first and second optical path deflecting elements, the first optical path deflecting element deflecting the picture elements by an amount of shift smaller than a pitch of the picture elements, the second optical path deflecting element deflecting the picture elements by an amount of shift corresponding to an effective picture element area, so as to increase an apparent number of picture elements displayed and increase a display area.

Additionally, there is provided according to another aspect of the present invention, a projection optical system for projecting a light modulated by a spatial light modulation element onto a projected surface, comprising: a plurality of lenses; an optical path deflecting element; and a drive part that drives the optical path deflecting element, wherein the optical path deflecting element is provided between a lens on a side of the spatial light modulation element and a lens on the projected surface. According to this invention, the reflection type optical path deflecting element can be provided in the optical system, which achieves a compact structure suitable for a structure in which an optical path is folded.

The projection optical system according to the above-mentioned invention may further comprise an aperture member, wherein the optical path deflecting element may be located adjacent to the aperture member. Alternatively, the projection optical system according to the above-mentioned invention may further comprise an aperture member, wherein the optical path deflecting element may be attached to the aperture member.

In the projection optical system according to the above-mentioned invention, the optical path deflecting element may include a mirror and a drive part that drives the mirror, and the drive part changes a inclination angle between an optical axis and a mirror surface of the mirror so as to deflect a projecting direction of a light. The inclination angle of the mirror may be changed at least in tow axial directions.

In the projection optical system according to the above-mentioned invention, the optical path deflecting elements may include two optical path deflecting elements that are arranged so that directions of deflecting the optical path by the two optical path deflecting elements are perpendicular to each other.

Additionally, there is provided according to another aspect of the present invention an image display apparatus comprising: the projection optical system as mentioned above; and an illumination light source projecting the light to the spatial light modulation element.

Other objects, features and advantages of the present invention will become more apparent from the following detailed description when read in conjunction with the accompanying drawings.

BEST MODE FOR CARRYING OUT THE INVENTION

Figure 1:
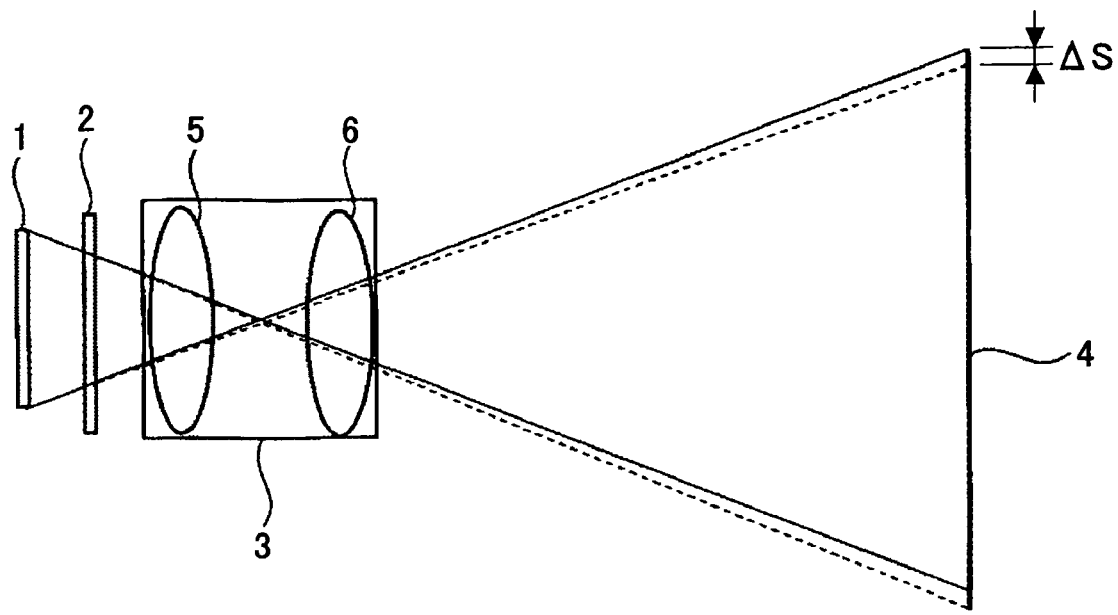
FIG. 1 is an illustration showing a basic structure of a projection optical system of a conventional image display apparatus.
Figure 2:
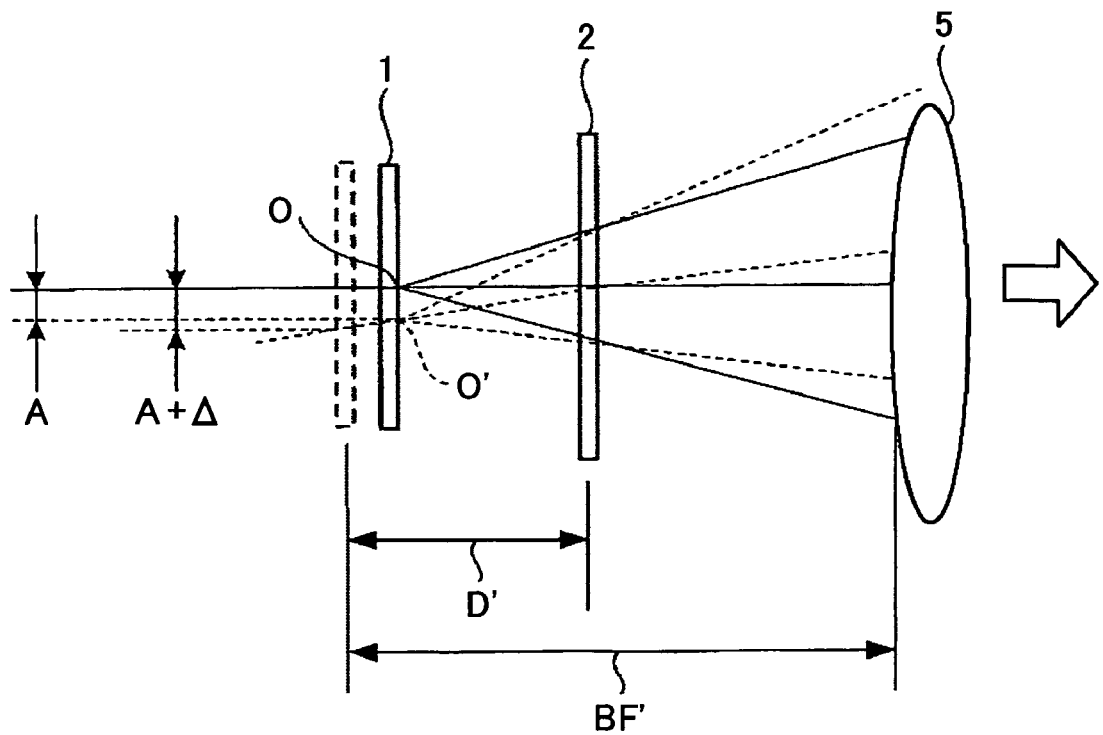
FIG. 2 is an illustration showing a positional relationship between a light valve and a projection lens.
Figure 3:
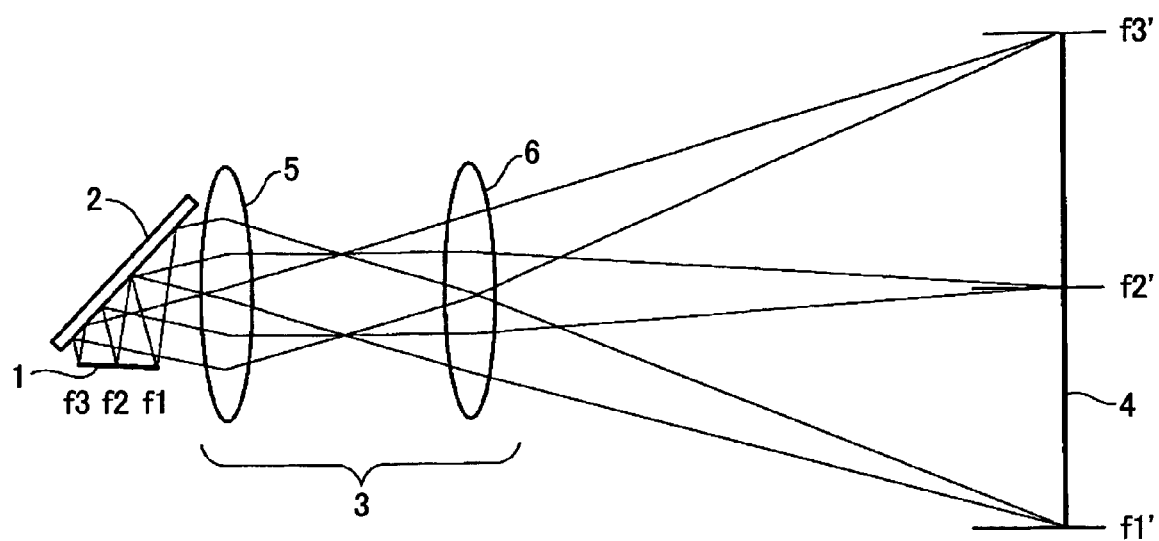
FIG. 3 is an illustration showing a conventional structure in which an optical path deflecting element is located between a projection optical system and an spatial light modulation element.

A description will now be given, with reference to FIGS. 4A and 4B, of an image display apparatus according to a first embodiment of the present invention. It should be noted that parts that are the same as the parts shown in FIGS. 1 through 3 are given the same reference numerals.

Figure 4A:
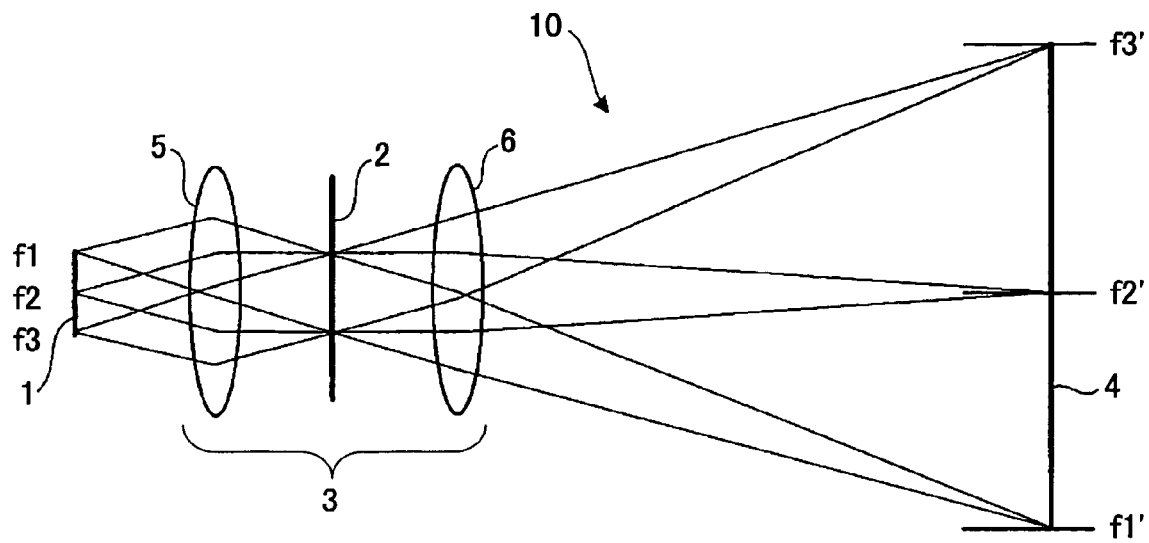
FIG. 4A is an illustration of a projection optical system provided in an optical display apparatus according to a first embodiment of the present invention.
Figure 4B:
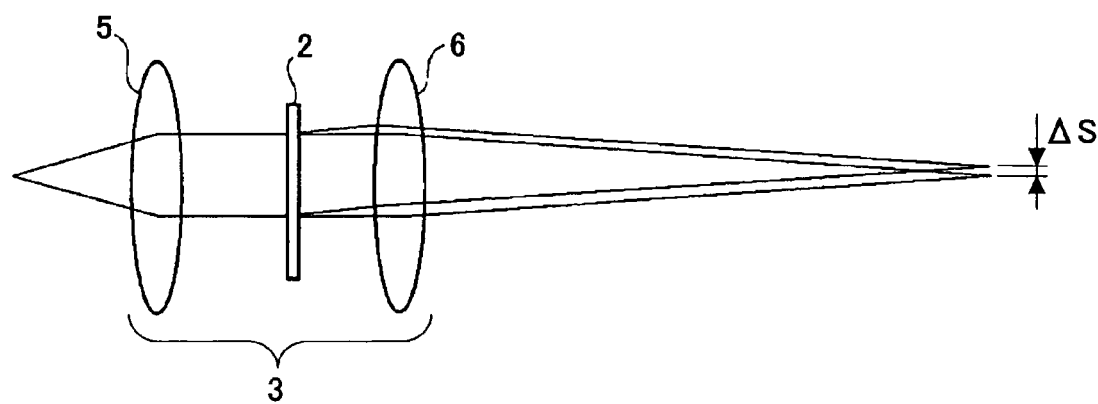
FIG. 4B is an illustration showing a condition of deflecting optical paths by an optical path deflecting element.

As shown in FIG. 4A, the image display apparatus 10 according to the first embodiment of the present invention comprises: a light source for illumination (not shown in the figure); a light valve 1 as a spatial light modulation element that displays an image; an optical path deflecting element 2 that deflects an optical path in accordance with a signal of the image formed on the light valve 1; and an objection optical system 3. The optical path deflecting element 2 is provided within the projection optical system 3.

The projection optical system 3 projects a light, which is modulated by a spatial light modulation element such as a liquid crystal device, a reflection type dot matrix liquid crystal device, a digital micro-mirror device, etc., onto a projection surface such as a screen. The projection optical system 3 comprises a plurality of lenses, apertures, mirrors, prisms, polarization optical systems, illumination optical systems, etc. It should be noted that the structure of the projection optical system 3 is not limited to that indicated in FIGS. 4A and 4B, and systems generally referred to as a projection optical system are included. Especially, there is known a fold-type projection optical system, which is used for a projection display and the like, and such a projection optical system is included in the projection optical system according to the present invention.

A description will be given, with reference to FIGS. 4A and 4B, of an operation of the image display apparatus according to the present embodiment. Each of image positions f1, f2 and f3 on the light valve 1 are projected onto the screen surface 4 by the projection optical system 3 at positions f1', f2' and f3' in a reversal pattern. In the present embodiment, a lens arrangement, in which the projection optical system 3 does not form a spatial image but form an inverted image on the screen surface 4.

Although it depends on a design, the projection optical system 3 uses, in many cases, an optical system, which is referred to as a telecentric optical system on an object side (the light valve 1 side) so as to efficiently taking a reflection light and acquire uniformity of illuminance on the projected screen surface. In the telecentric optical system, main lights from image positions on the light valve 1 are parallel to each other. In such an optical system, the lights once divergingly spread are converged by a first stage optical system, and are passed through optical paths in the lens system, which optical paths are refracted by an angle smaller than the reflected diverging lights from the light valve 1 so that the lights that exit from a final plane of the optical system form images on the screen surface 4. That is, in the conventional telecentric projection optical system used in projection apparatuses, an angle of traveling a light within the optical system correspond to image information (picture element position information) on the object plane (on the light valve 1).

FIG. 4A shows a schematic diagram of the projection optical system 3 describing the optical paths parallel to each other in the system. FIG. 4B shows a condition of deflecting the optical paths by the optical path deflecting element 2.

The optical paths are deflected by a minute angle in the optical system so as to achieve a desired picture element shift (an amount of shift $\Delta S$) on the screen surface 4. The direction of the shift of picture elements can be one of a horizontal direction, a vertical direction, a direction of combination of the horizontal and vertical directions and an oblique direction. An attempt can be made to achieve high resolution by the shift of the picture elements.

In many projection-type display apparatuses using a telecentric optical system as the projection optical system 3, the picture element position information on the light valve 1 can be related with angle information of a main light in the optical path. By arranging the conventional optical path deflecting element 2 in the optical system so as to apply a conventional drive method, the picture element shift can be easily achieved, which provides a fine and high resolution image. There is an advantage in that a change in the amount of picture element shift due to a position adjustment of the light valve 1 is smaller than that of the conventional technique. This advantage is maximized when the optical path deflecting element 2 is located at a position where the optical paths are substantially parallel to each other in the projection optical system 3.

Although not shown in the figure, the image display apparatus 10 further comprises an illumination optical system, which efficiently introduces illumination light to the light valve 1, and an image forming system for acquiring a color image. A so-called color sequential method can be used, in which R, G, B color illumination lights are time-sequentially projected onto a single panel (the light valve 1) at a high switching rate by which R, G, B switching cannot be recognized visually so as to form a color image.

Moreover, a method of projecting an image synthesized by dichroic prism or the like by projecting R, G, B lights to the light valve 1 corresponding to each color of R, G, B and enlarged by shifting picture elements may be used. As an illumination light source applicable to the image display apparatus 10 according to the present embodiment, there are halogen lamp, a xenon lamp, a metal halide lamp, an ultra-high pressure mercury lamp, etc. Moreover, a monochromatic light such as an LED lamp or an LD may also be applicable. A white LED having high brightness be applicable as an illumination light source.

An illumination optical system may be mounted so as to obtain high illumination efficiency. As a specific example of the illumination optical system, there is an ultra-high pressure mercury lamp having a reflector located in the vicinity of the light source (integrated with the light source).

An illumination optical system may be mounted, which provides a uniform illumination distribution on the panel surface by using an illuminance uniformizing means such as referred to as an integrator optical system (fly-eye lens pair), which processes a light having a directivity by being reflected by a reflector. Additionally, as a light valve applicable to the light valve 1, there are a transmission type liquid crystal panel, a digital micro-mirror device (DMD; trademark; manufactured by Texas Instruments Incorporated), etc. Although not illustrated in the figure, when using a reflection type crystal liquid light valve, a separating means combined with a polarization beam splitter for separating an illumination optical path from a projection optical path may be used to obtain an efficient illumination.

When mounting the above-mentioned DMD panel (trademark: Texas Instruments Incorporated) as a light valve, there are used an oblique incidence optical system, an optical path separator using a total reflection prism, etc. When using a light valve having not polarization dependability, it is suitable in the viewpoint of optical utilization efficiency to use a galvanometer mirror, a micro-mirror array, etc., as an optical path deflecting element 2. Thus, a suitable optical system may be used in accordance with a kind of the light valve 1.

Figure 5:
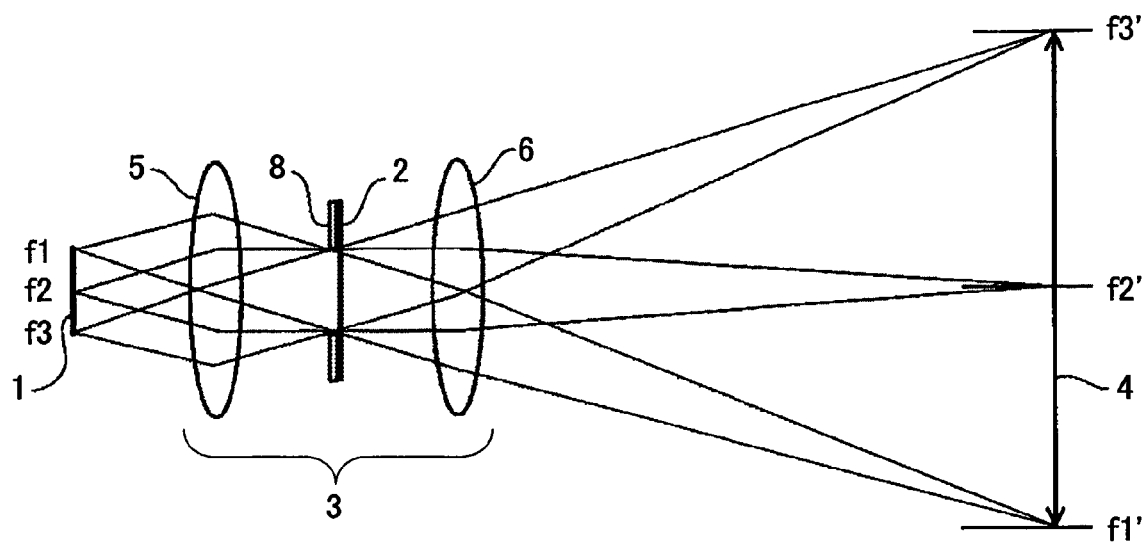
FIG. 5 is an illustration of an optical system of an image display apparatus according to a second embodiment of the present invention.

A description will now be given of an image display apparatus according to a second embodiment of the present invention. In the second embodiment, in addition to the structure of the first embodiment, the optical path deflecting element 2 is provided at or in the vicinity of an aperture position in the projection optical system 3 as shown in FIG. 5.

Figure 6:
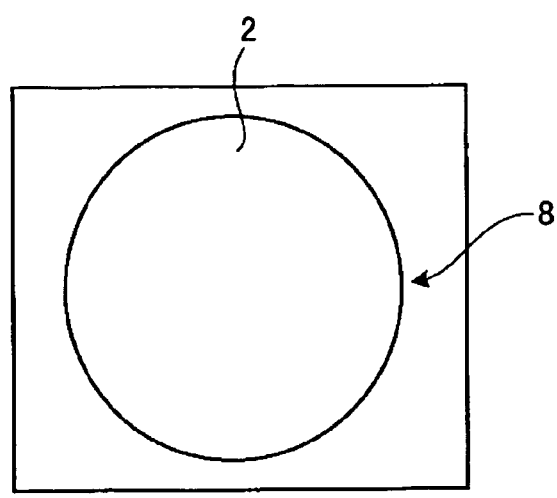
FIG. 6 is an illustration of a aperture member and an optical path deflecting element viewed in an optical axis direction.

FIG. 6 shows an aperture member 8 located at the aperture position in the projection optical system. By using the aperture member 8 sown in FIG. 6, the aperture position coincides with a position of providing the optical path deflecting element 2. It should be noted that the form of the aperture shown in FIG. 6 is merely an example, and the aperture is not limited to a circular shape. For example, the aperture may be a square shape corresponding to the screen size, or may be an elliptic shape.

Since the lights from all picture elements on the light valve 1 pass through an effective area of a transmission plane of the optical path deflecting element 2, there is less influence of variation in the plane of the optical path deflecting element 2 (variation in the position of the optical path deflecting angle). According to the conventional technique in which the optical path deflecting element is located between a projection lens and a light valve, the lights of the picture elements f1 and f2 on the light valve 1 as shown in FIG. 4A do not spatially coincide with each other immediately after exiting from the light valve 1, and positions in the optical path deflecting element 2 at which the lights from the picture elements pass through are different from each other.

That is, there is a problem in the conventional method in which the optical path deflecting, element 2 is located between a projection lens and a light valve in that the lights passing through the optical path deflecting element 2 tend to receive influence of in-plane variation of the optical path deflecting element 2. However, arranging the optical path deflecting element 2 at or in the vicinity of the aperture position provides an effect to uniformize the variation, thereby uniformizing an amount of picture element shift.

A description will now be given, with respect to FIG. 7, of an image display apparatus according to a third embodiment of the present invention. In the third embodiment according to the present invention, a deflecting angle can be formed so as to improve a freedom of setting and achieve a compact optical system. In the present embodiment, in addition to the arrangement in which the optical path deflecting element 2 is located within the projection optical system 3, the optical path deflecting element 2 is made as a reflection type.

As an operation, a reflected optical path is deflected by the optical path deflecting element by a minute angle so as to generate a desired picture element shift on the screen surface 4. By performing a high-speed shift within a time period, which is not recognized by a human sense, apparent high resolution can be achieved. In FIG. 7, the deflecting angle is enlarged for the purpose of explaining the picture element shift.

In the conventional structure shown in FIG. 3 in which the optical path deflecting element 2 is located between the projection optical system 3 and the light valve 1, a space for folding lights is required between the optical path deflecting element 2 and the projection optical system 3. Thus, if the optical path deflecting element 2 is located as shown in FIG. 3, a room for locating other optical parts such as a prism for separating an illumination light from an image forming light or a prism for color synthesizing is greatly reduced. Therefore, an optical system having a long back focus is needed.

Thus, if the back focus is sufficiently long, a reflection type optical path deflecting element can be located in the conventional structure in which the optical path deflecting element 2 is located between the projection optical system 3 and the light valve 1. However, in practice, a space to a projection lens is occupied by optical parts such as a PBS for optical path separation or a dichroic prism, and, thus, it is not possible to locate a reflection type optical path deflecting element between the light valve 1 and the projection optical system 3.

On the other hand, if the reflection type optical path deflecting element 2 is located within the optical system as in the present embodiment, problems including the problem on the layout can be solved all at once. Additionally, since the folded optical system is used for the projection optical system 3, the projection optical system 3 can be made compact.

Figure 8:
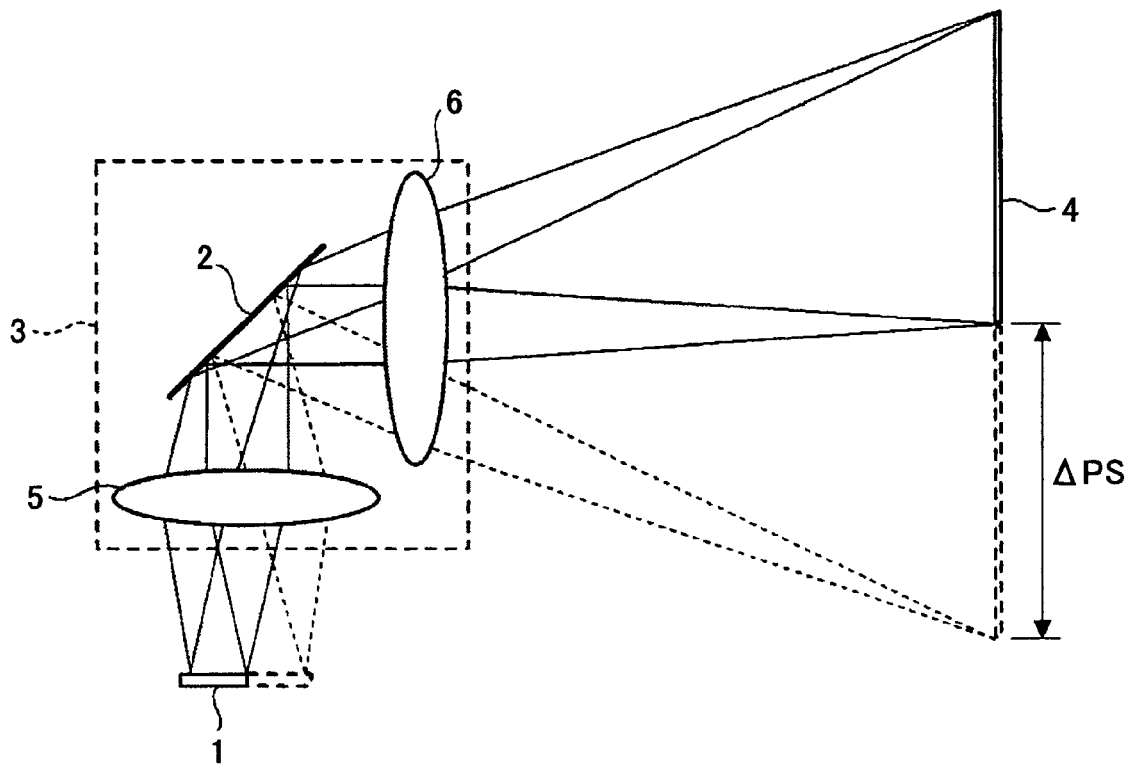
FIG. 8 is an illustration showing a condition of optical paths for increasing a screen size by shifting an amount equal to or larger than a screen size in a shifting direction.

Moreover, there also is the following advantage if the optical path deflecting element 2 is provided in the projection optical system 3. As shown in FIG. 8, when performing the picture element shift within an effective picture element area, an amount of the picture element shift is increased so that a head line of a position frame (a lowermost line indicated by dotted lines on the screen 4) is smoothly connected to an end line of the position frame (an uppermost line indicated by solid lines on the screen 4), and it is needed to acquire a high accuracy. That is, the picture elements must be arranged so that a connecting part of the image cannot be visually recognized. Thus, by locating the optical path deflecting element 2 in the optical system, an influence of in-plane variation of the optical path deflecting element 2 can be eliminated, which enables acquisition of an amount of shift accurately at the connection part.

A description will now be given, with reference to FIG. 9, of an image display apparatus according to a fourth embodiment of the present invention. In the present embodiment, a display area can be enlarged, and the picture elements displayed on the light valve 1 are effectively used so that an aspect ratio can be changed without deteriorating resolution. In order to achieve the above-mentioned feature, an amount of shift of a picture element by the optical path deflecting element 2 is set to be equal to a plurality of picture elements so as to apparently change a display size.

Figure 9:
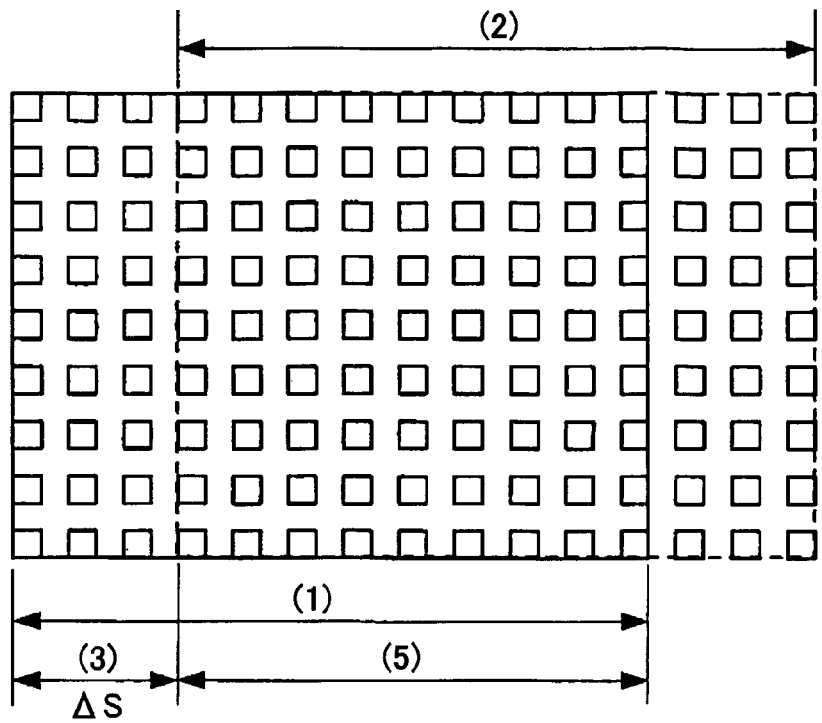
FIG. 9 an illustration for explaining a shifting operation performed in an image display apparatus according to a fourth embodiment of the present invention.

FIG. 9 shows a screen (1), which has no picture element shift, and a screen (2), which is picture-element-shifted. Both the screens are overlapped with each other by an amount of shift ΔS indicated by (3). In the figure, each small square □ corresponds to a picture element. It should be noted that one side of the square □ in the figure is about a half of one side of the spatial light modulation element since the light modulated by the spatial light modulation element is reduced by a microlens or the like.

FIG. 9 shows a state where the picture element shifting direction is set to a transverse direction of the screen, and the image is shifted in the transverse direction so that the aspect ratio of the light valve 1 is shifted from 4(transverse):3(longitudinal) into 16(transverse):9(longitudinal). Consequently, although there is produced a portion (5) in which the screen (1) and the screen (2) are overlapped with each other, the image is displayed by switching the display on the light valve 1 according to image processing so that the image is displayed as if they are the same image.

A description will now be given, with reference to FIG. 10, of a fifth embodiment of the present invention. In the present embodiment, a display area is enlarged and an apparent resolution in a center portion is increased so as to achieve an image display of a higher quality.

Figure 10:
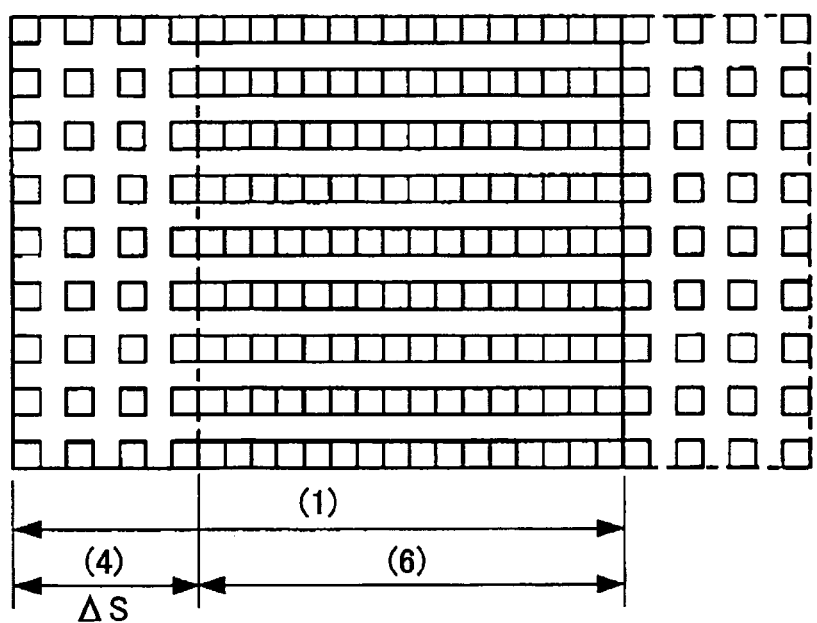
FIG. 10 is an illustration for explaining a shifting operation performed in an image display apparatus according to a fifth embodiment of the present invention.

A density of picture elements in an overlapping area (6) in FIG. 10 can be doubled by further performing a ½ picture element shift on the overlapping area (5) shown in FIG. 9 in the above-mentioned fourth embodiment. This technique enables an increase in resolution in a center portion, especially, in television or the like.

A description will now be given of a sixth embodiment of the present invention. In the present embodiment, a display area is doubled so as to increase resolution and enables a display of two screens independently so as to improve convenience of use of the image display apparatus.

Figure 11:
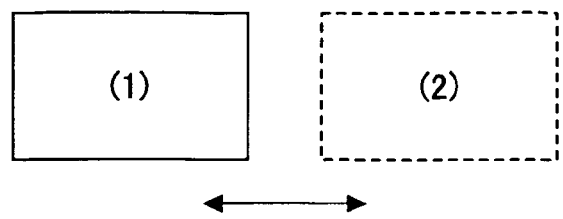
FIG. 11 is an illustration for explaining a shifting operation performed in an image display apparatus according to a sixth embodiment of the present invention.

Although it is required to align the picture elements accurately in the structure of the above-mentioned fifth embodiment, the picture element shifting may be performed until the display areas are completely separated. That is, as shown in FIG. 11, the screen (1) and the screen (2) are completely separated from each other in the transverse direction. In this case, a deflection angle is set to a value to completely separate the display area as shown in FIG. 11. The direction of separation may be a vertical direction or horizontal direction or an oblique direction.

Since double screen display is achieved, the image display apparatus can be applicable to variety of applications. Additionally, each of the screens can display different image separately. Further, this technique can be applied to a 3-dimensional image display using parallax between left and right screens. Thus, if an attempt is made to merely provide two separate screens, there is no need to match the connection part of two screens at a picture element level.

A description will now be given, with reference to FIGS. 7, 8 and 12, of a seventh embodiment of the present invention. In the seventh embodiment, handling of polarized light is eliminated so as to improve efficiency of use of light.

In the structure of the above-mentioned fifth and sixth embodiments, a galvanometer mirror is used as the optical path deflecting element 2. Since switching using polarization dependability is performed in the conventional optical path deflecting element using a liquid crystal member, it is suitable to use a structure combined with a liquid crystal panel as the light valve. On the other hand, using the structure of the present embodiment, it becomes easy to use a reflection type light valve using a micro-mirror device (DMD: registered trademark; manufactured by Texas Instrument Incorporated). That is, there is no need to use a polarized light transformation optical system or a polarized light separating element for separating an illumination light from a projection image forming light, which achieves a more simplified optical system.

Figure 12:
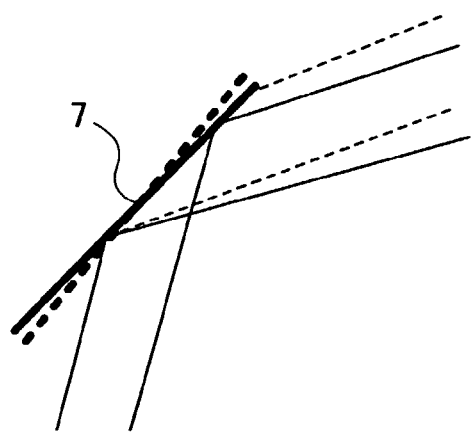
FIG. 12 is an illustration showing a state where a deflecting direction of a reflected light is switched between two directions by a galvanometer mirror.

FIG. 12 illustrates a state where a deflecting direction of a reflected light from the light valve 1 is switched between two directions at a high switching rate by a galvanometer mirror 7 as the optical path deflecting element. The optical paths in the two directions are indicated by solid lines and dotted lines. As illustrated in the figure, a reflecting point differs between a position in the vicinity of a supporting point of the galvanometer mirror 7 and a position remote from the supporting point.

That is, the optical system is an eccentric system, and an image deterioration, which is not a problem under a condition of a minute angle change, becomes a cause to deteriorate a projection performance in a high-resolution image display apparatus, which performs a picture element shift on a frame unit basis requiring a deflecting angle to be set large.

By using the micro-mirror device (DMD: registered trademark; manufactured by Texas Instruments Incorporated) as means for eliminating such a difference in optical paths, a reflecting angle can be assigned on each minute area basis. Thus, there is no change in the reflection point such as indicated by solid lines and dotted lines shown in FIG. 12, which enables preventing an image from being deteriorated due to an act of the projection optical system.

The micro-mirror device (DMD: registered trademark; manufactured by Texas Instruments Incorporated) provides a high-speed mechanical switching rate such as several few microseconds to several tens microseconds, and a state of image during picture element shifting can be almost negligible. In the optical path deflecting element using a liquid crystal, a deterioration of an apparent resolution is prevented by not displaying an image during a time period for deflecting, that is, shifting the picture elements by interrupting the light (interrupting the light on the illumination side at a high rate or interrupt the light by the light valve).

On the other hand, using the micro-mirror device (DMD: registered trademark; manufactured by Texas Instruments Incorporated) enables elimination of such an interruption of light. Additionally, the micro-mirror device (DMD: registered trademark; manufactured by Texas Instruments Incorporated) can provide a mirror deflecting angle of several degrees to several tens degrees, the device is suitable for shifting an entire frame.

Figure 7:
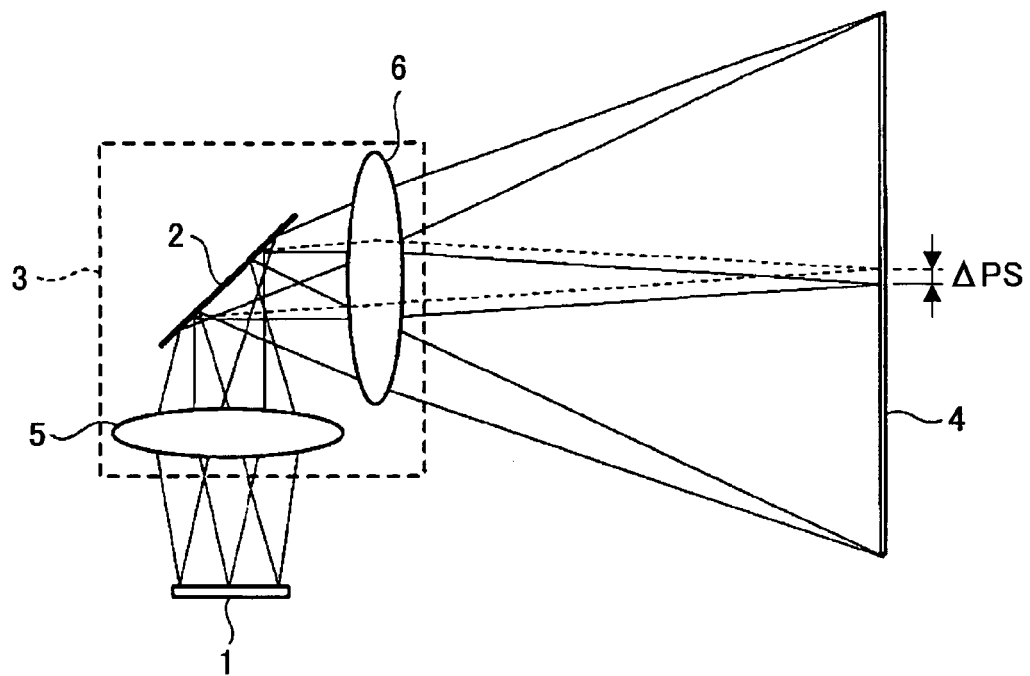
FIG. 7 is an illustration showing a condition of optical paths for performing an apparently high-resolution display by an amount of shift equal to or smaller than a picture element pitch.

FIG. 7 illustrates a condition of optical paths for performing an apparently high-resolution display by an amount of shift equal to or smaller than a picture element pitch. FIG. 8 illustrates a condition of optical paths for increasing a screen size by shifting an amount equal to or larger than a screen size in a shifting direction.

A description will be given of an eighth embodiment of the present invention. In the present embodiment, a variation in reflecting position, which is a problem of the optical path deflecting element having a large diameter mirror, is prevented so as to provide a high-quality image. Additionally, a high-speed drive is realized by making the optical path deflecting element by minute mirrors so as to increase a picture element shifting rate. Further, interruption of light, which is needed in the conventional technique, is eliminated so as to attempt an improvement in efficiency of use of light.

Specifically, in the present embodiment, a mirror array having mechanically movable mirrors in a two-dimensional pattern is used as the optical path deflecting element 2 of the above-mentioned fifth and sixth embodiments. As a mirror array in which mechanically movable mirrors are arranged in a two-dimensional patter, the micro-mirror device (DMD: registered trademark; manufactured by Texas Instruments Incorporated) is a typical device, and is used in the present embodiment as the optical path deflecting element.

Figure 13:
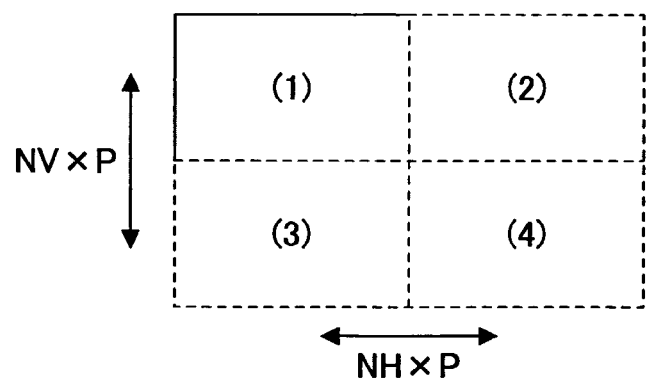
FIG. 13 is an illustration for explaining a shifting operation performed in an image display apparatus according to a ninth embodiment of the present invention.

A description will be given, with reference to FIG. 13, of a ninth embodiment of the present invention. In the present embodiment, in addition to the structure of the seventh embodiment, an attempt is made to realize an increase in a number of effective picture elements and an improvement in fineness of an image at a low cost.

In the present embodiment, directions of increasing a number of picture elements are set to two directions perpendicular to each other. Specifically, as shown in FIG. 13, the number of picture elements is doubled in each of the vertical and horizontal directions so that a total number of picture elements becomes four times. It should be noted that FIG. 13 illustrates an enlarged display area on a projection screen. The display area is multiplied by four and the number of picture elements is also multiplied by four by shifting an amount corresponding to (a number of effective picture elements in the vertical direction)×(a pitch of the picture elements in the vertical direction) in the vertical direction, and also shifting an amount corresponding to (a number of effective picture elements in the horizontal direction)×(a pitch of the picture elements in the horizontal direction) in the horizontal direction.

When the picture element shift is not made, only the picture element corresponding to the position (1) is displayed. However, in the present embodiment, the light valve is operated by repeating the picture element shift at a high rate so as to enlarge the display area by driving the light valve to output image signals corresponding to the positions of (2) through (4) in synchronization with the picture element shift.

A description will now be given of a tenth embodiment of the present invention. In the present embodiment, in addition to the object of the seventh embodiment, an attempt is made to realize an increase in a number of effective picture elements and an improvement in fineness of an image at a low cost.

Specifically, an apparent number of picture elements is increased by doubling a number of picture elements by shifting the picture elements by an amount of shift smaller than a picture element pitch by the optical path deflecting element 2, which performs deflection of a minute angle, and also by doubling the display area by the picture element shift corresponding to the effective picture-elements of the light valve 1. If an optical path deflecting element 2A shifts a half pitch of the picture elements, and an optical path deflecting element 2B shifts an amount corresponding to the effective picture elements of the light valve 1, there are considered 8 combinations, that is, a structure in which both the optical path deflecting elements 2A and 2B are located between the light valve 1 and the projection optical system 3, a structure in which one of the optical path deflecting elements 2A and 2B is located within the projection optical system 3, and whether each of the optical path deflecting elements 2A and 2B is a reflection type or a transmission type. It has an advantage for a layout to locate the optical path deflecting elements 2A before the projection optical system 3 and locate the optical path deflecting elements 2B in the projection optical system 3.

Figure 14A:
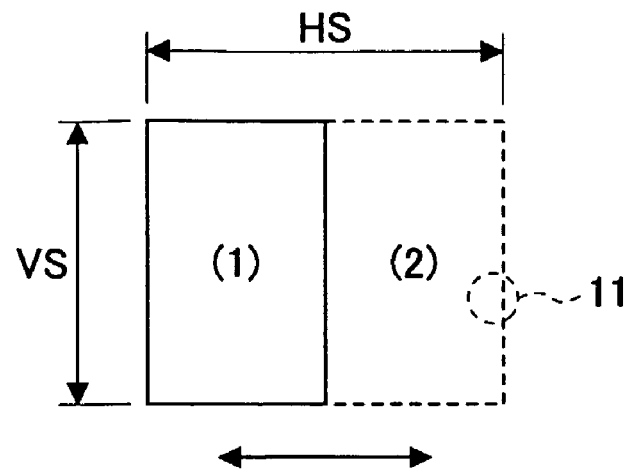
FIG. 14A is an illustration for explaining a shifting operation performed in an image display apparatus according to a eleventh embodiment of the present invention.
Figure 14B:
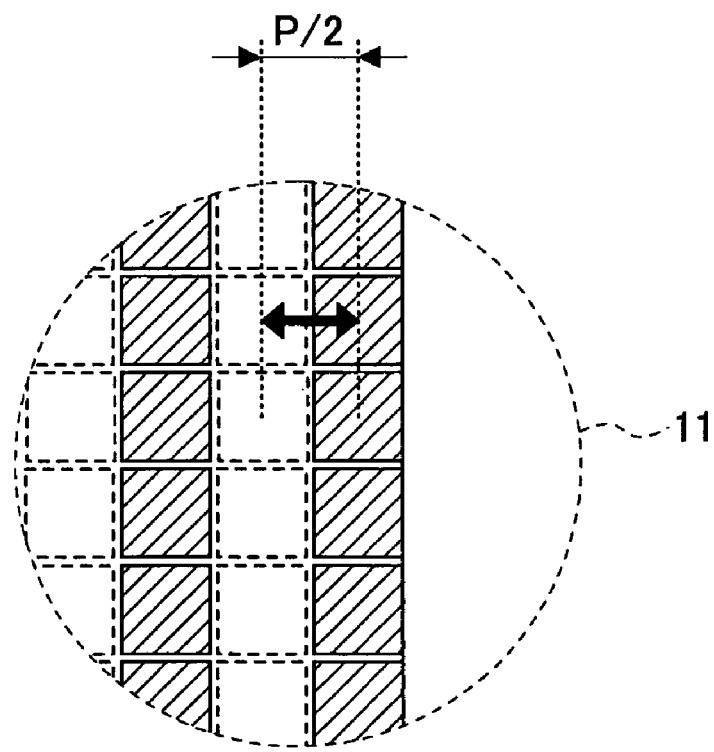
FIG. 14B is an enlarged view of a part encircled by a dotted line in FIG. 14A.
Figure 15A:
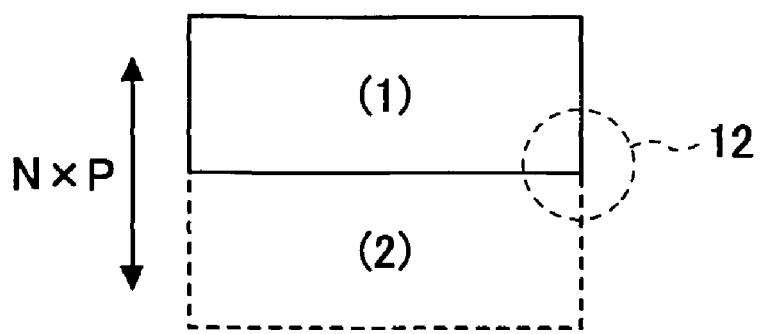
FIG. 15A is an illustration for explaining a shifting operation performed in an image display apparatus according to a twelfth embodiment of the present invention.
Figure 15B:
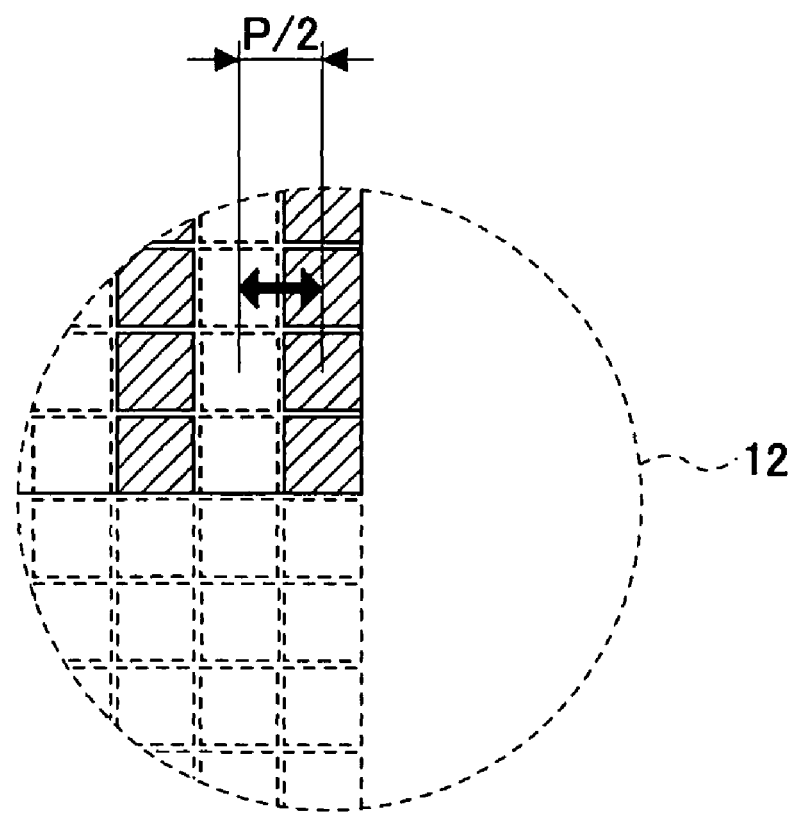
FIG. 15B is an enlarged view of a part encircled by a dotted line in FIG. 15A.

FIG. 14A illustrates an entire screen. FIG. 14B illustrates an enlarged portion 11 encircled by a dotted line in FIG. 14A. The panel size has an aspect ratio corresponding to a vertically elongated display area, which is half-divided into left and right so as to acquire a display size having a desired aspect ratio by the optical path deflecting element 2. In the horizontal direction, a half of a pitch P of the picture elements is shifted at a high rate so as to display a total of four timed the number of picture elements (eleventh embodiment).

Each of the above-mentioned embodiments is an example, and the relationship between the vertical direction and the horizontal direction may be reversed. Additionally, there is an effect even if it is the same direction.

FIG. 10 illustrates a twelfth embodiment of the present invention in which the display area is shifted in the vertical direction and the picture elements are shifted by an amount of a half of the pitch P.

Figure 16A:
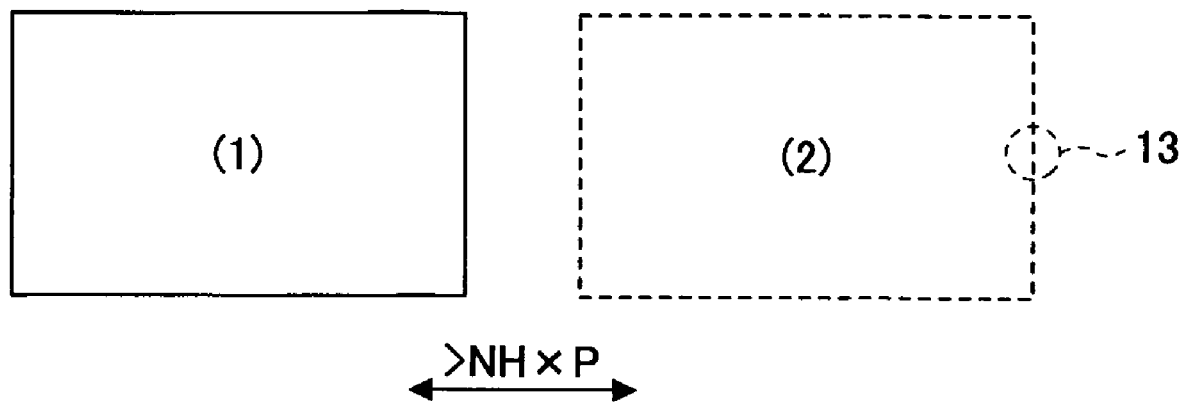
FIG. 16A is an illustration for explaining a shifting operation performed in an image display apparatus according to a thirteenth embodiment of the present invention.
Figure 16B:
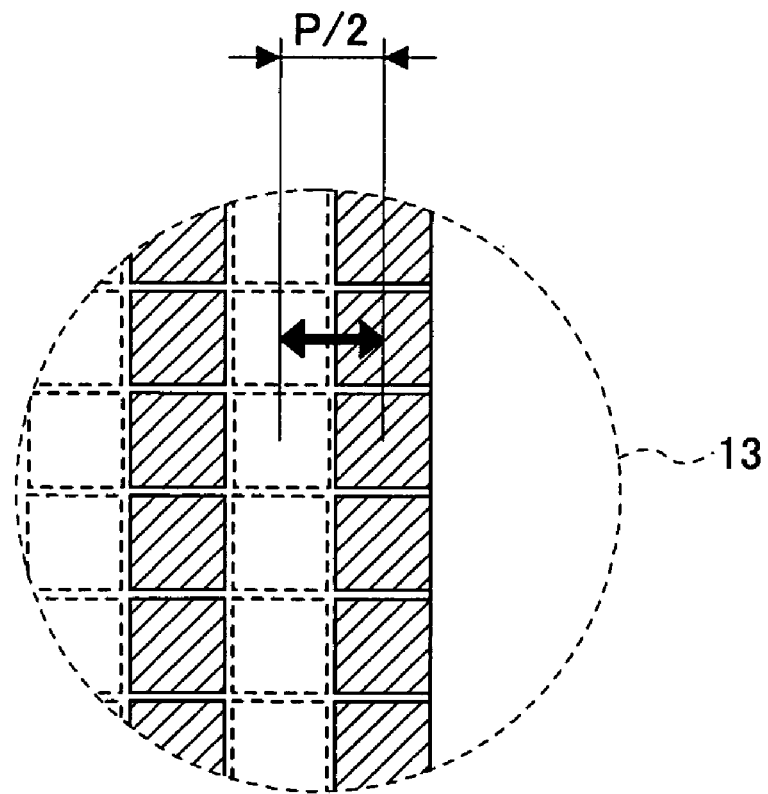
FIG. 16B is an enlarged view of a part encircled by a dotted line in FIG. 16A.

FIGS. 16A and 16B illustrate a thirteenth embodiment of the present invention. In the thirteenth embodiment, the two screen display by shifting an amount equal to or larger than the screen size in the horizontal direction and the high resolution and display size enlargement by a combination of the ½ picture element shift are achieved simultaneously.

Figure 17:
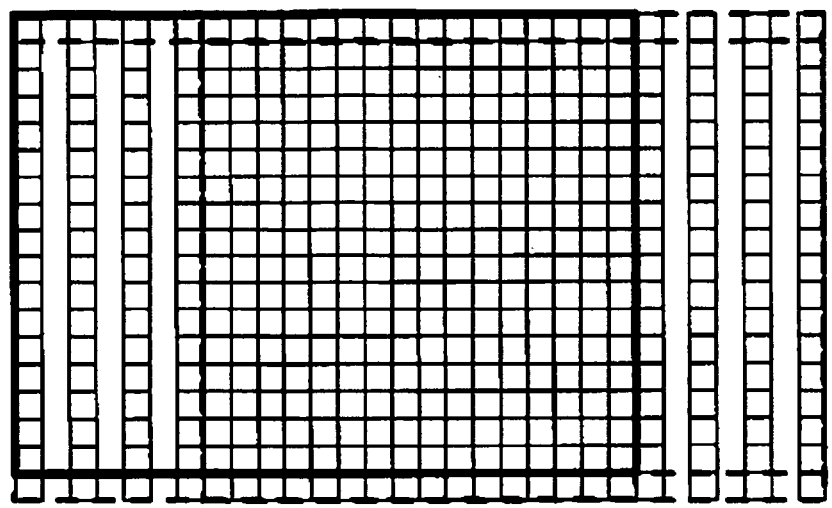
FIG. 17 is an illustration for explaining a shifting operation performed in an image display apparatus according to a fourteenth embodiment of the present invention.

FIG. 17 illustrates a screen for explaining a fourteenth embodiment of the present invention. In the fourteenth embodiment, an amount of shift in a direction in which an aspect ratio is to be changed, corresponds to a plurality of picture elements, and a ½ pitch is shifted in a direction in which an aspect ratio is to be changed. Although not illustrated in the figure, the picture element density may be doubled by shifting the optical path deflecting element 2, which deflects light by a minute angle, in an oblique direction.

Although the optical path deflecting element performs an angle deflection in one direction using a mirror array in which mechanically movable mirrors are arranged in a two-dimensional pattern, such as the micro-mirror device (DMD: registered trademark; manufactured by Texas Instruments Incorporated), the present invention is not limited to such a drive in one-dimensional direction. If the mirror array can be driven in two directions perpendicular to each other, it becomes possible to perform a display, which doubles the number of picture elements in each of the vertical and horizontal directions by a single mirror array.

Figure 18:
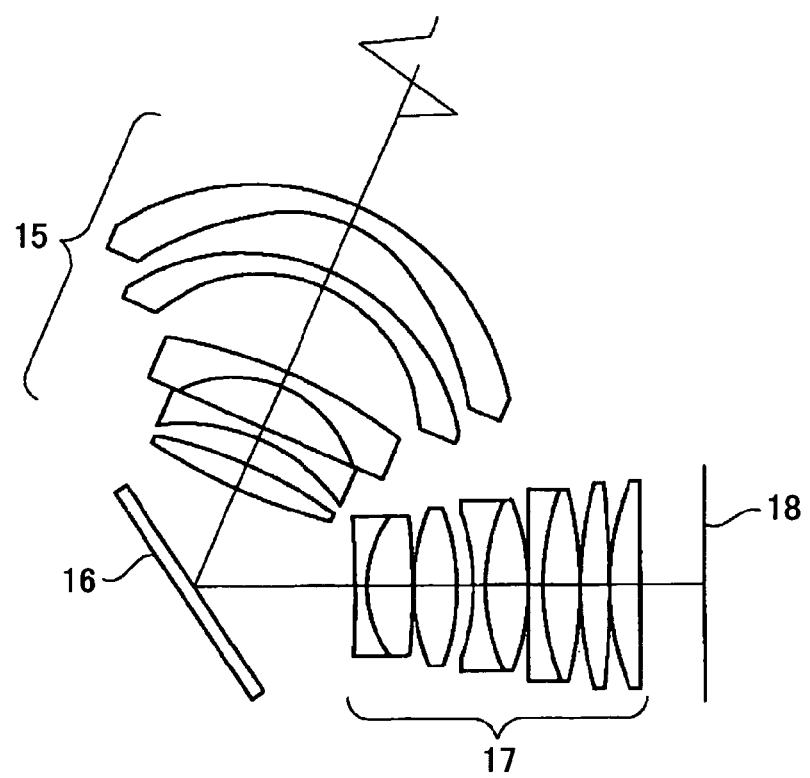
FIG. 18 is an illustration of an optical system of an image display apparatus according to a fifth embodiment of the present invention.

FIG. 18 illustrates an optical system according to a fifteenth embodiment of the present invention. In the present embodiment, an optical path deflecting element consisting of a mirror is provided in a projection optical system.

A light exiting from a spatial light modulation element (not shown in the figure) is incident on a projection optical system 15 from the left side in the figure. The light incident on the projection optical system 15 passes through a projection lens and is reflected by the optical path deflecting element 16 consisting of a mirror. Then, the light passes through a projection lens (projection optical system 17) which is provided in an oblique direction viewed from the light incident axis, and the light forms an image on a projected surface 18 such as a screen.

Here, the optical path deflecting element 16 consisting of a mirror is provided with a drive part such as an actuator so as to change an inclination angle to the light incident axis of the optical path deflecting element 16. By changing the inclination angle of the optical path deflecting element 16 at a high rate, the direction of the reflected light reflected by the optical path deflecting element 16 is changed at a high rate. Thus, a light exiting from one picture element can be seen by human eyes as if the light exited from two picture elements.

As a specific drive mechanism, a piezoelectric element is use as the actuator for driving the optical path deflecting element 16, wherein the piezoelectric element is attached to one side of the mirror of the optical path deflecting element 16 and an opposite side of the mirror is supported so that a displacement generated by the piezoelectric element is converted into a change in the angle of the mirror. By controlling a voltage applied to the piezoelectric element, the angle of deflection of the optical pat can be controlled. Additionally, an actuator mechanism using an electromagnetic drive, which is conventionally used in a pickup optical system, may be used. Further, a supporting portion of the mirror may be made to substantially one point so as to achieve two drive axes. The projection optical system shown in FIG. 18 are so-called projection lenses, which use a conventional refraction optical system, and the present invention is not limited to such a lens configuration.

A description will be given of a sixteenth embodiment of the present invention. In the present embodiment two optical path deflecting elements, which can deflect an optical path in one axis direction, are used and the two optical path deflecting elements are arranged so that the directions of deflection of the two are perpendicular to each other, thereby changing the direction of deflection of the optical path in four different directions.

According to the above-mentioned structure, a light exiting from one picture element can be seen by human eyes as if the light exited from four picture elements due to persistence of vision. Of course, according to a lens design layout, two folding parts may be provided in the optical system and two sets of optical path deflections may be performed. Or, one of the optical path deflecting elements, which performed optical path deflection at least in one axis direction, may be provided in the optical system and the other may be provided between the panel and the projection optical system. According to the structure in which the two-sets of optical path deflecting elements are provided between the panel and the projection optical system, a distance between the panel and the projection lens can be reduced, which improves a freedom of layout design.

The present invention is not limited to the specifically disclosed embodiments, and variations and modifications may be made without departing from the scope of the present invention.

The invention claimed is:

1. An image display apparatus, comprising:
an illumination light source;
a spatial light modulation element that displays an image;
a projection optical system that enlarges and projects the image formed on the spatial light modulation element;
an optical path deflecting element provided between said spatial light modulation element and the image formed on a screen by the projection optical system so as to deflect an optical path for the image projected on the screen in two directions in accordance with a screen frame period, said optical path deflecting element shifting the optical path for the image projected on the screen at a high rate so as to apparently increase a number of picture elements,
wherein said optical path deflecting element is located within said projection optical system, and a distance between the two deflected optical paths on the screen is smaller than a picture element pitch of the image formed on the screen.

2. The image display apparatus as claimed in claim 1, wherein said optical path deflecting element is located at or in the vicinity of an aperture position of said projection optical system.

3. The image display apparatus as claimed in claim 1, wherein said optical path deflecting element is a reflection type optical path deflecting element.

4. The image display apparatus as claimed in claim 3, wherein said optical path deflecting element is a galvanometer mirror.

5. The image display apparatus as claimed in claim 3, wherein said optical path deflecting element is a mirror array having mechanically movable mirrors arranged tow-dimensionally.

6. The image display apparatus as claimed in claim 1, wherein a multiple screen display is performed by increasing an amount of a shift of picture elements acquired by said optical path deflecting element to be larger than a width of an arrangement of the picture elements in a direction of the shift of the picture elements.

7. The image display apparatus as claimed in claim 1, wherein said optical path deflecting element includes at least two sets of elements each of which shifts the picture elements in one direction so that the picture elements are shifted at a high rate in directions perpendicular to each other.

8. The image display apparatus as claimed in claim 1, wherein said optical path deflecting element is located at a position where the optical paths inside the projection optical system are substantially parallel to each other.

9. A projection optical system for projecting a light modulated by a spatial light modulation element onto a projected surface, comprising:
a plurality of lenses;
an optical path deflecting element; and
a drive part that drives the optical path deflecting element, wherein said optical path deflecting element is provided between a lens on a side of said spatial light modulation element and a lens on said projected surface,
wherein said optical path deflecting element is driven to deflect the optical path by an amount of shift smaller than a picture element pitch of the image on the projected surface.

10. The projection optical system as claimed in claim 9, further comprising an aperture member, wherein said optical path deflecting element is located adjacent to said aperture member.

11. The projection optical system as claimed in claim 9, further comprising an aperture member, wherein said optical path deflecting element is provided in an opening part of said aperture member.

12. The projection optical system as claimed in claim 9, wherein said optical path deflecting element includes a mirror and a drive part that drives the mirror, and said drive part changes a inclination angle between an optical axis and a mirror surface of said mirror so as to deflect a projecting direction of a light.

13. The projection optical system as claimed in claim 12, wherein the inclination angle of said mirror is changed at least in two axial directions.

14. The projection optical system as claimed in claim 9, wherein said optical path deflecting elements includes two optical path deflecting elements that are arranged so that directions of deflecting the optical path by the two optical path deflecting elements are perpendicular to each other.

15. An image display apparatus comprising:
the projection optical system as claimed in claim 9; and
an illumination light source projecting the light to the spatial light modulation element.

16. The projection optical system as claimed in claim 9, wherein said optical path deflecting element is located at a position where the optical paths inside the projection optical system are substantially parallel to each other.

* * * * *